May 22, 1928.

R. H. MILLER 1,670,310

TORSION BALANCE

Filed April 18, 1925

Inventor:
Robert H. Miller,
His Attorneys

May 22, 1928. 1,670,310
R. H. MILLER
TORSION BALANCE
Filed April 18, 1925 2 Sheets-Sheet 2
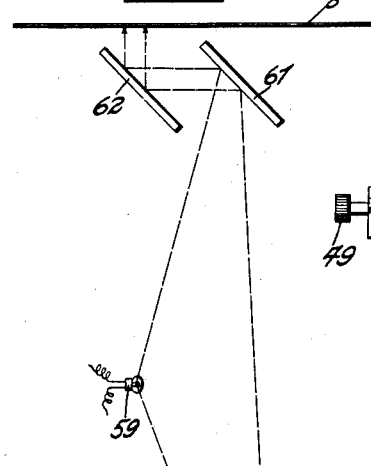
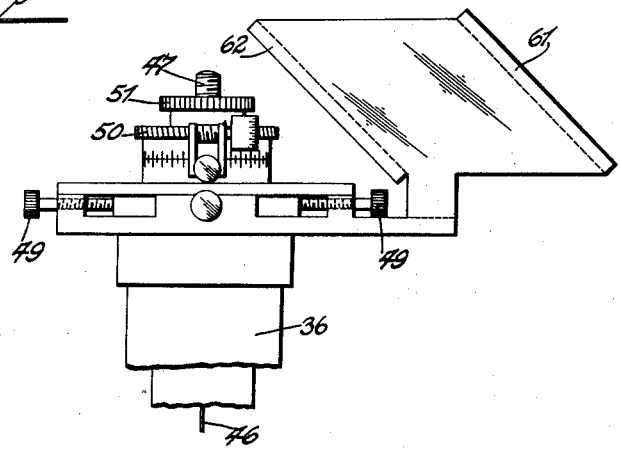
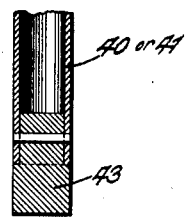
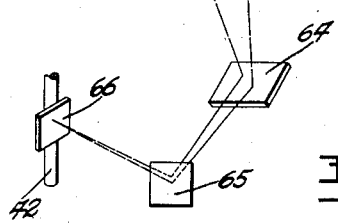
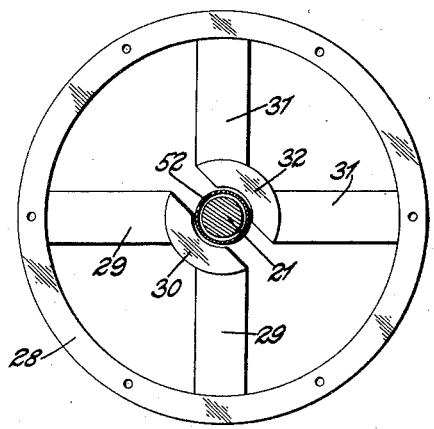
Inventor:
Robert H. Miller,
His Attorneys.

Patented May 22, 1928.

1,670,310

UNITED STATES PATENT OFFICE.

ROBERT H. MILLER, OF HOUSTON, TEXAS.

TORSION BALANCE.

Application filed April 18, 1925. Serial No. 24,161.

This invention relates to improvements in torsion balances, and consists in the novel construction hereinafter disclosed.

It is known that where a balance arm is suspended upon a suspension wire the influence exerted at different points on the balance arm by certain mineral formations varies in degree and direction. This variation causes an oscillation of the arm in a rotary direction forming a torque in the suspension wire. By calculating the degree of distortion of the suspension wire, caused by the different forces on the separated points on the balance arm, the location and extent of mineral formations such, for instance, as formations accompanying oil deposits, bodies of ore, and the like, may be determined.

In apparatus in which the balance arm is suspended upon a suspension wire of sufficient degree of sensibility to respond to the effect of such mineral formations, a considerable degree of oscillation is imparted to the filament, requiring an extended period of time for the arm to come to rest.

One of the objects of the present invention is to minimize the oscillation of the balance arm and to reduce the time in which the balance arm shall come to rest, thereby affording calculation of the normal distortion of the suspension wire due to the influence of the mineral deposits.

In the use of torsion balances for the purposes mentioned difficulty has been experienced in making a satisfactory graphic representation to illustrate the degree and extent of the distortion of the suspension wire. Therefore, a further object of the invention is to improve the construction of torsion balances in such way that a satisfactory graphic representation of the action of the suspension wire may be accurately determined.

A general object of the invention is to improve torsion balances so that the accuracy, speed and facility of operation may be increased.

Various other objects of the invention will be apparent from the following detailed description thereof, taken in connection with the accompanying drawings, in which Fig. 1 is a vertical section of the apparatus.

Fig. 2 is a diagrammatic view of the reflectors utilized in producing the graphic representation.

Fig. 3 is a detailed view of the torsion head for adjusting the suspension wire.

Fig. 4 is a detailed view of the frame for the electro magnetic field and the associated parts.

Fig. 5 is a detailed sectional view of one end of the balance arm illustrating the method of attaching the balance weight.

Figure 1:
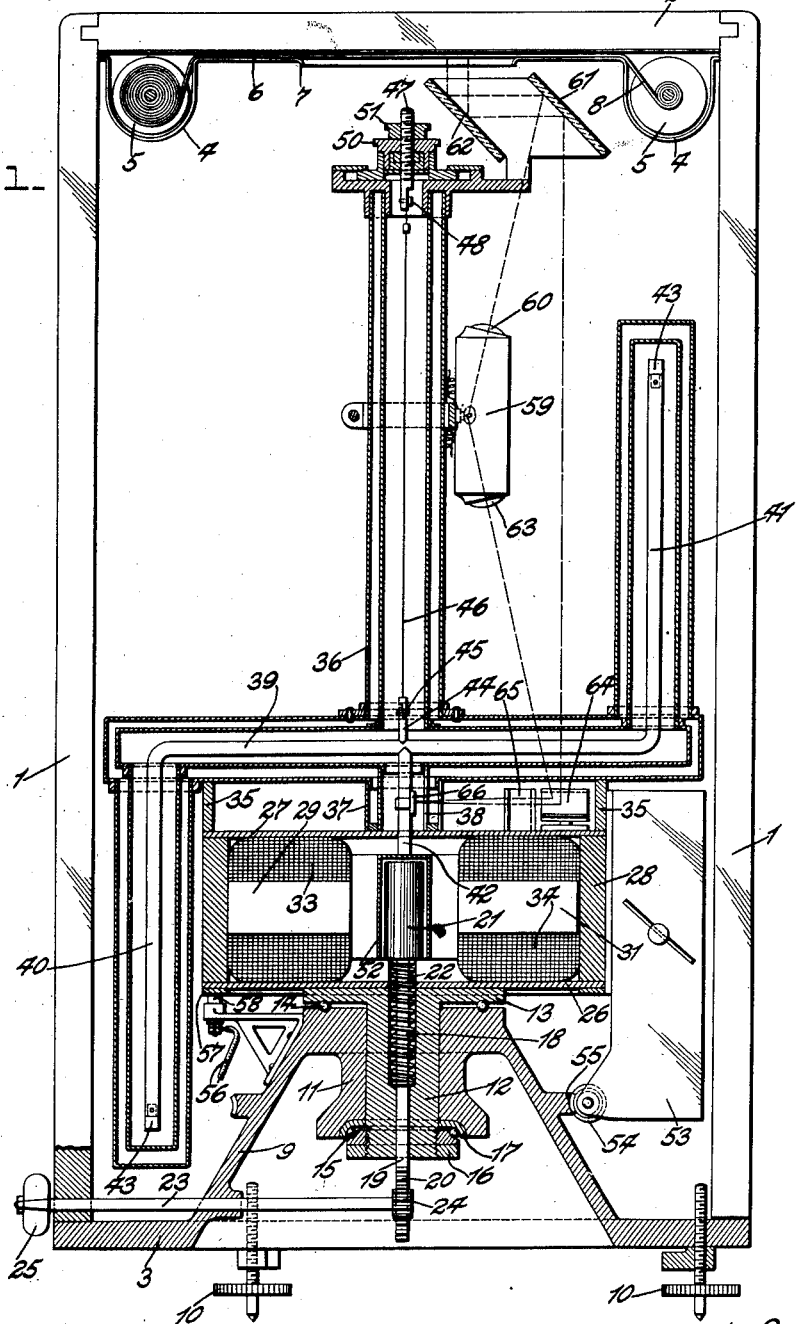

In the embodiment of the invention illustrated in the drawings the apparatus is shown as including a case comprising side members 1, a top member 2 and a base 3. The side members 1 form a rectangular enclosure, the upper end of which is closed by the top member 2 having tongue and groove connections with the side members. On the under face of the top member 2 is a frame or housing for a photographic film, said housing including a photographic film spool support 4 in which the spools 5 are mounted. Between the supports 4 is a horizontal casing 6 with a central opening 7. A photographic film 8 is wound on the spools 5 so as to expose an area of the photographic film across the opening 7. In the bottom part of the housing is a standard 9 that serves as a bearing member for the rotating parts of the apparatus. The bottom of the housing is provided with transit leveling screws 10 for leveling the apparatus. It will be understood that the entire housing is so made that it will form a light-proof container for the apparatus.

The standard 9 is formed with an axial bushing 11. A revoluble member, including a cylindrical portion 12 that extends through the bushing 11 and a flange 13, is supported for non-frictional rotation upon ball bearings 14 between the upper face of the standard 9 and the under face of the flange 13, and also by ball bearings 15 between a cone 16 screwed over the lower end of the cylindrical portion 12, and a race way 17 fitted in the lower end of the bearing 11. The upper face of the portion 12 has a recess 18 formed therein through which extends a rod 19 having a rack 20 on its lower end. The upper end of the rod 19 supports a cylindrical iron core 21 and an expansion spring 22 seats in the recess 18 around the rod 19 and bears against the bottom of the recess at one end and the under face of the iron core 21 at its upper end. A rod 23 extends through the housing of the apparatus and has a pinion 24 on its inner end, said pinion meshing with the rack 20 and the said rod 23 being operated by a hand wheel 25. By rotation of the rod 23 the rod 19 is raised and lowered for the purpose hereinafter described.

A housing for an electromagnet is supported by and rotated with the flange 13 of the portion 12. The housing comprises a bottim plate 26 and a top plate 27 mounted on the top and bottom respectively of the side wall 28 of the field winding frame for the electromagnetic coils. Extending inwardly from the side walls 28 are spaced arms constituting the cores for the electromagnet coils, said arms being connected in pairs. The arms 29 carry a segment 30 and the arms 31 carry a segment 32, the electromagnet being so wound that the polarity of the field of the coils 33 supported on the arms 29 will be opposite to the polarity of the coils 34 supported on the arms 31, thus giving a straight field inside the ring segments 30 and 32, the field being concentrated by the soft iron core 21.

A ring 35 supported upon the electromagnet housing serves as a connector and support for the housing for the balance arm and suspension wire. The housing referred to is in itself not new in construction and comprises merely a double wall structure 36, following in formation the lateral and vertical arms of the balance arm and the vertical suspension wire upon which the balance arm is supported. It is only necessary to mention that the housing 36, in addition to being supported by the ring 35, is axially supported by the vertical walls 37 that rest upon the top of the plate 27 near its axis and that at one side, within the area of oscillation of a mirror carried by a portion of the balance arm, there are translucent panels 38 provided for the purpose hereinafter mentioned.

The balance arm comprises a hollow tube preferably made of aluminum having a horizontal portion 39, a vertical arm 40 and a vertical arm 41, and an integrally formed axial vertical section 42. In the opposite ends of the balance arm are inset weights 43. A stem 44 coaxial with the section 42 of the balance arm serves as one member of a connector 45 for connecting the balance arm with the suspension wire 46.

The upper end of the suspension wire is connected with a screw stud 47 by a connector 48, said screw stud being a portion of the torsion head of known construction, said torsion head being supported at the upper part of the housing 36. The torsion head has screws 49 for laterally adjusting the position of the suspension wire. A collar 50 and the nut 51 serve for adjusting the suspension wire vertically and circumferentially.

The section 42 of the balance arm carries at its lower end a hollow cylinder 52 closed at its upper end and open at its bottom end, said cylinder being preferably made of silver and embracing the cylindrical core 21. The electromagnetic case, the balance arm and suspension wire are arranged to rotate about the standard 9, the power for the rotation being provided by a standard clock construction 53 by which a worm pinion 54 is operated, said pinion 54 meshing with a worm rack 55 supported by the standard 9.

It will be noted also that the balance arm is free to oscillate upon the suspension wire within the housing for these parts. Inasmuch as the electromagnetic field crossing from the ring segments 30 and 32 to the core 21 through the cylinder 52 sets up strong eddy currents in the cylinder, the normal oscillation of the balance arm is resisted, effecting substantially a dead beat in the oscillation of the arm without, however, effecting the final equilibrium position of the blance.

Inasmuch as the electromagnet is required to rotate, provision is made for energizing the magnet from stationary leads 56 electrically connected with a contact ring 57 by contact members 58. As the specific winding and electrical connection for the magnet is not an essential part of this invention, its further description is unnecessary.

In recording the operation of the apparatus, which primarily is the degree of torsion of the suspension wire by a system of reflectors, light rays are utilized for tracing the graphic representation upon an exposed area of a photographic film. For this purpose a plural lens lamp 59 is provided, the light from which, by virtue of a substantially vertically disposed lens 60, directs a fixed ray against a reflector 61, the angle of which is so arranged that the ray will be deflected horizontally against a reflector 62, thence vertically to a point within the opening 7 of the photographic film housing. This ray is a fixed ray independent of the operation of the apparatus and constitutes a coordinate from which oscillation or torsion of the suspension wire is measured. The torsion of the suspension wire is graphically represented by an oscillating ray responding to the deflection of the suspension wire. The lamp 59 is provided with a downwardly projecting lens 63, designed to direct a ray against a reflector 64 carried by a portion of the rotating part of the apparatus and in the embodiment shown by the top of the plate 27. From the reflector 64 the ray is deflected to another reflector 65, also carried by a rotating part of the apparatus and in the embodiment shown by the top of the electromagnet housing. The angularity of the reflectors 64 and 65 is such that the ray is deflected first from the reflector 64 at such an angle to the reflector 65 that it will strike the reflector 66 vertically supported by the section 42 of the balance arm. Inasmuch as the section 42 of the balance arm is coaxial with the suspension wire 46, as the torque is developed in the suspension wire 46 the lateral angle of the reflector 66 will vary. From the reflector 66 the ray is returned to the reflector 65, the reflector 64 and the two reflectors 61 and 62, and thence to the surface of the exposed film, striking the film in a vertical direction. Obviously, however, as the angle of the reflector 66 is changed by the distortion of the suspension wire, the distance between the fixed ray and the ray influenced by the reflector 66 will vary according to the degree of distortion of the suspension wire.

It will be noted that all of the reflectors are carried by the rotating parts of the apparatus, so that a substantially circular graphic will be formed by the fixed ray, and an irregular figure will be traced by the oscillating ray as the apparatus is rotated during one complete rotation.

In the operation of the apparatus it is set at a station and allowed to make one complete rotation to form the graphic representation upon the exposed section of the film. Upon changing the station and completing an additional graphic representation upon a new section of the film a figure different from the oscillating ray will be traced. By making a sufficient number of graphic representations and by comparing the degree and extent of oscillation of the suspension wire, the location, formation and extent of the influencing mineral deposit may be calculated with a fair degree of accuracy.

When the apparatus is not in use by raising the rod 19 the spring 22 functions to raise the core 21 against the cylinder 52, releasing the tension upon the suspension wire 46 and thereby locking the balance arm against oscillation.

I am aware that the invention may be modified in various particulars without departing from the spirit and scope thereof, I do not limit myself unessentially therefore, but what I claim and desire to secure by Letters Patent is:—

1. In a torsion balance, a balance arm, a torsion suspension for said arm, an electromagnet, a concentrating core for the electromagnet, and a member connected to the balance arm and located between the core and the magnet for damping the oscillation of said arm.

2. In an instrument for locating mineral deposits, a balance arm, torsion suspension for said arm, an electromagnet for developing a straight field, a concentrating core for the electromagnet, and a device within the field carried by said balance arm for damping the oscillation of said arm.

3. In an instrument for locating mineral deposits, a balance arm, torsion suspension for said arm, an electromagnet for developing a straight field, a concentrating core for the electromagnet, and a device carried by the arm and comprising a hollow cylinder over said core and within the field of said magnet for damping the oscillation of said arm.

4. In a torsion balance, a balance arm, a torsion suspension for said arm, an electromagnetic device including an electromagnet and a concentrating core whereby a field is created, and a cylindrical member connected with the balance arm and located within said field.

5. In a torsion balance, the combination of a balance arm and a torsion suspension for said arm, an electromagnet having pole pieces with a circular space therebetween, a concentrating core concentrically arranged in respect of said space, and a hollow cylindrical manner forming an axial extension of the torsion suspension, the walls of which are interposed between the field of the magnet and the concentrating core.

6. In a torsion balance, the combination of a balance arm and a torsion suspension for said arm, an electromagnet having pole pieces with a circular space therebetween, a concentrating core concentrically arranged in respect of said space, and a hollow silver cylindrical member forming an axial extension of the torsion suspension, the walls of which are interposed between the field of the magnet and the concentrating core.

7. In a torsion balance, a rotary housing, means for rotating the housing, a torsion arm disposed within the housing, a torsion suspension for the arm supported in the housing, an electromagnet arranged to revolve with the housing, a concentrating core, a device within the field between the electromagnet and said core carried by the balance arm for damping the oscillation of the arm, and electrical connections for energizing the electromagnet throughout its orbit of rotary movement from terminals supported by a stationary part of the apparatus.

8. In a torison balance, the combination of a balance arm and a torsion suspension for said arm, an electromagnet having pole pieces with a circular space therebetween, a concentrating core concentrically arranged in respect of said space, a hollow cylindrical member forming an axial extension of the torsion suspension, the walls of which are interposed between the field of the magnet and the concentrating core, and means for moving said concentrating core endwise and thereby elevating said torsion arm to release the tension upon the torsion suspension.

9. In a torsion balance, the combination of a torsion arm comprising a central member and vertical extensions at each end thereof extending in opposite directions, a torsion wire connected intermediate of said central member to said arm, an extension in axial alinement with said torsion wire, a metallic cup-shaped member carried by said extension, an electromagnet having pole pieces formed to provide a space circumscribing said cup-shaped element, and a concentrating core within said cup-shaped element.

10. In a torsion balance, the combination of a torsion arm comprising a central member and vertical extensions at each end thereof extending in opposite directions, a torsion wire connected intermediate of said central member to said arm, an extension in axial alinement with said torsion wire, a metallic cup-shaped member carried by said extension, an electromagnet having pole pieces formed to provide a space circumscribing said cup-shaped element, a concentrating core within said cup-shaped element, and a housing arranged for rotary movement and wherein the electromagnet, the balance arm and the suspension wire are supported.

ROBERT H. MILLER.